United States Patent [19]

Seo

[11] Patent Number: 5,715,161
[45] Date of Patent: Feb. 3, 1998

[54] SYSTEM AND METHOD FOR ELIMINATING ERROR CODE OF AN AUTOMATIC TRANSMISSION AND RELATED CONTROL

[75] Inventor: Jeongdo Seo, Kyungki-do, Rep. of Korea

[73] Assignee: Hyundai Motor Company, Rep. of Korea

[21] Appl. No.: 636,853

[22] Filed: Apr. 23, 1996

Related U.S. Application Data

[63] Continuation-in-part of Ser. No. 363,911, Dec. 27, 1994, abandoned.

[30] Foreign Application Priority Data

Dec. 28, 1993 [KR] Rep. of Korea ............... 1993 30294

[51] Int. Cl.$^6$ .............................. G06G 7/76; G06F 11/00
[52] U.S. Cl. ......................... 364/424.034; 364/424.039; 364/424.04; 364/424.082; 364/431.11; 340/438; 371/30; 371/41; 371/3
[58] Field of Search ................. 371/37.1, 38.1, 371/39.1, 41, 55, 68.2, 30, 3, 5.1, 5.2, 5.3; 395/183.21, 185.01, 185.08, 185.05, 181, 182.04, 183.01, 184.01; 364/424.04, 424.034, 424.035, 423.098, 424.039, 424.082, 424.036, 431.04, 431.11, 431.12

[56] References Cited

U.S. PATENT DOCUMENTS

| | | | |
|---|---|---|---|
| 4,271,402 | 6/1981 | Kastura et al. | 364/424.04 |
| 4,277,772 | 7/1981 | Kastura et al. | 340/459 |
| 4,361,060 | 11/1982 | Smyth | 364/424.1 |
| 4,500,957 | 2/1985 | Hanamoto et al. | 364/431.1 |
| 4,505,246 | 3/1985 | Nakajima et al. | 123/688 |
| 4,844,038 | 7/1989 | Yamato et al. | 123/685 |
| 4,947,392 | 8/1990 | Wada | 364/431.1 |
| 5,019,799 | 5/1991 | Oshiage et al. | 340/438 |
| 5,019,981 | 5/1991 | Oshita et al. | 364/424.05 |
| 5,050,427 | 9/1991 | Cote et al. | 73/118.1 |
| 5,055,825 | 10/1991 | Yang | 364/424.03 |
| 5,060,177 | 10/1991 | Gregory et al. | 73/118.1 |
| 5,159,912 | 11/1992 | Klein et al. | 123/481 |
| 5,255,208 | 10/1993 | Thakore et al. | 364/424.04 |
| 5,276,619 | 1/1994 | Ohara et al. | 364/424.04 |
| 5,416,728 | 5/1995 | Rudzewicz et al. | 364/424.05 |

*Primary Examiner*—Jacques Louis-Jacques
*Attorney, Agent, or Firm*—Finnegan, Henderson, Farabow, Garrett & Dunner, L.L.P.

[57] ABSTRACT

A system and method for eliminating error codes of an automatic transmission includes an ignition switch for producing an electrical signal in response to an activation of the switch. A control unit includes a memory for storing data corresponding to an abnormal operating condition and a counter for counting the number of times the ignition switch is activated when the switch is turned on. A sensor determines whether an abnormal operating condition has occurred and the counter is increased by a predetermined number when the abnormal operating condition has not occurred. Another sensor determines whether an error code is generated and a comparator compares a value of the counter to a predetermined value when the error code is not generated. An error code eliminator eliminates the error code is response to the comparison from the comparator.

6 Claims, 9 Drawing Sheets

SYSTEM AND METHOD FOR ELIMINATING ERROR CODE OF AN AUTOMATIC TRANSMISSION AND RELATED CONTROL

This application is a continuation-in-part of application Ser. No. 08/363,911, filed Dec. 27, 1994, now abandoned.

BACKGROUND OF THE INVENTION

1. Field of the Invention

The present invention relates to a control system for an automatic transmission. More particularly, the present invention relates to a system for eliminating or cancelling error codes of an automatic transmission and a method for controlling the system.

2. Description of the Related Art

Generally, when an automatic transmission controlling unit of an automotive vehicle operates abnormally, an error code corresponding to the part responsible for the abnormal operation is generated. The automatic transmission controlling unit stores the error code in a memory and displays the error code stored in the memory to warn the driver that the vehicle is operating abnormally.

Once the abnormally operating part has been identified and repaired, the error code should be cancelled or removed from the memory. However, if the error code is not removed, even after the part has been repaired, then the abnormal condition continues to be displayed, which should be corrected.

For example, consider temperature measurements of hydraulic fluid in an automatic transmission in which the temperature of the hydraulic fluid is greater than a set temperature. In conventional methods, if the number of temperature measurements (in which the temperature of the hydraulic fluid of the automatic transmission is greater than a set temperature) is greater than a predetermined number, an automatic eliminating operation or a manual eliminating operation has been executed. In the automatic eliminating operation, the automatic transmission controlling unit eliminates or cancels the error codes automatically. In the manual eliminating operation, a user eliminates or cancels the error code stored in the memory manually using a multi-user tester.

However, according to the conventional methods, error codes are eliminated from considering the number of measurements in which the temperature of the hydraulic fluid of the automatic transmission is determined to be greater than the set temperature. This may cause problems from error codes stored in the memory over a predetermined period of time.

In addition, the conventional manual eliminating method requires a special equipment, such as the multi-user tester, which makes it difficult to promptly and efficiently eliminate the error codes.

SUMMARY OF THE INVENTION

It is an object of the present invention to provide a system for eliminating or cancelling error codes of an automatic transmission in an automotive vehicle to eliminate an error code easily and promptly.

It is another object of the present invention to prevent errors due to error codes remaining in a memory even after the part causing the error codes is repaired.

It is a further object of the present invention to provide means for turning on a start switch more than a predetermined number of times or operating a predetermined shift lever and a switch without any special equipment to prevent errors.

The features and advantages of the invention will be set forth in the description which follows, and in part will be apparent from the description, or may be learned by practice of the invention. The objective and other advantages of the invention will be realized and attained by the system and method particularly pointed out in the written description and claims hereof as well as the appended drawings.

To achieve this and other objects and in accordance with the purpose of the invention, as embodied and broadly described herein, a system for eliminating an error code of an automatic transmission comprises an ignition switch for producing an electrical signal in response to an activation of the switch; a control unit including: a memory for storing data corresponding to be an abnormal operating condition; means for setting a counter to count the number of times the ignition switch is activated when the switch is turned on; means for determining whether an abnormal operating condition has occurred; means for increasing the counter by a predetermined number when the abnormal operating condition has not occurred; means for determining whether an error code is generated; means for comparing a value of the counter to a predetermined value when the error code is not generated; and means, in response to the comparing means, for eliminating the error code.

In another aspect, the present invention provides a method for eliminating an error code of an automatic transmission vehicle comprising the steps of setting a counter for counting the number of times an ignition switch is turned on; determining whether the ignition switch is turned on; determining whether a memory storage is changed when the ignition switch is turned on; increasing the counter by a predetermined value when the memory storage has not changed; determining whether the error code is generated when the memory storage has not changed; comparing the counter with a predetermined value when the error code is not generated; and eliminating the error code when the counter is greater than or equal to the predetermined value.

In another aspect, the present invention provides a system for eliminating an error code of an automatic transmission of an automotive vehicle comprising means for sensing a first rotating frequency of an engine and producing an electrical signal corresponding to the first frequency; means for sensing a second rotating frequency of a turbine and producing an electrical signal corresponding to the second frequency; means for sensing a third rotating frequency produced from an automatic transmission and producing an electrical signal corresponding to the third rotating frequency; means for sensing an opening level of the throttle valve and producing an electrical signal corresponding to the opening level; a switching means including an ignition switch, a mode selection switch, and an inhibiter switch for producing an electrical signal according to a selection by a driver; an automatic transmission controlling unit for setting a timer and a counter when power is applied, for receiving the signal corresponding to the turbine rotating frequency to determine whether an engine stops when a malfunction occurs in a part receiving the rotation of the engine, for receiving the signals corresponding to the turbine rotating frequency and output rotating frequency to determine whether the engine stops when an ignition fault and a malfunction occur in the sensing means, for receiving the signal corresponding to the engine rotating frequency to determine whether the engine stops when the ignition fault does not occur, for determining the condition of the present shift lever and driving mode when the engine stops and an opening level of the throttle valve is greater than a predetermined level to eliminate the error code and for setting a counter to 1 when the shift lever is set at a first position and the driving mode is at an economy mode at an initial stage, for determining again the shift lever and driving mode when the shift lever is set at a second gear position and the driving mode is at the economy mode and for setting a counter to 2 when the shift lever is set at a third position and the driving mode is at the economy mode and for determining the shift lever and driving mode when the shift lever is at a fourth gear position and the driving mode is at the economy mode and initializing the counter provided the shift lever is set at a fourth gear position and the driving mode is at a power mode, and then eliminating the error code.

In a further aspect, the present invention provides a method for eliminating an error code of an automotive transmission vehicle comprising the steps of initializing all variables and setting each value of a counter and a timer when power is applied; determining whether conditions for turning on an ignition switch, stopping an engine and the automotive vehicle are satisfied and whether an opening level of a throttle valve is at a value greater than a predetermined level; determining whether the present shift lever is set at a first gear position and a driving mode is at an economy mode and increasing the timer by 1 and setting the counter to 1 when the shift lever is at the first gear position and the driving mode is at the economy mode to complete a first step for eliminating the error code; increasing the timer by 1 and setting the counter to 2 to complete the second step for eliminating the error code, provided the shift lever is at a second gear position and the driving mode is at the economy mode after the first step and when the shift lever is at a second gear position and the driving mode is a power mode; increasing the timer by 1 and setting the counter to 3 to complete the third step for eliminating the error code, provided the shift lever is at a third gear position and the driving mode is at the power mode and then the shift lever is set at a third gear position and the driving mode is at the economy mode; and initializing the timer and the counter and eliminating the error code to complete the operation, provided the shift lever is set at a fourth gear position and the driving mode is at the economy mode and then the shift lever is at a fourth gear position and the driving mode is at the power mode after the third step; wherein the step for determining whether the condition for eliminating the error code are generated comprises the steps of determining whether the turbine rotating frequency is less than a predetermined value and the engine stops when an ignition fault occurs in a part receiving the rotation of the engine; sensing the turbine rotating frequency and the output rotating signal and determining whether the engine stops, when the ignition fault occurs and a malfunction occurs in a plurality of sensors; the engine rotating frequency and determining whether the engine stops when the ignition fault does not occur; and comparing an opening level of a throttle valve to a predetermined level for eliminating the error code when the engine stops.

DETAILED DESCRIPTION OF THE PREFERRED EMBODIMENTS

Reference will now be made in detail to the preferred embodiments of the invention, examples of which are illustrated in the accompanying drawings.

Figure 1:
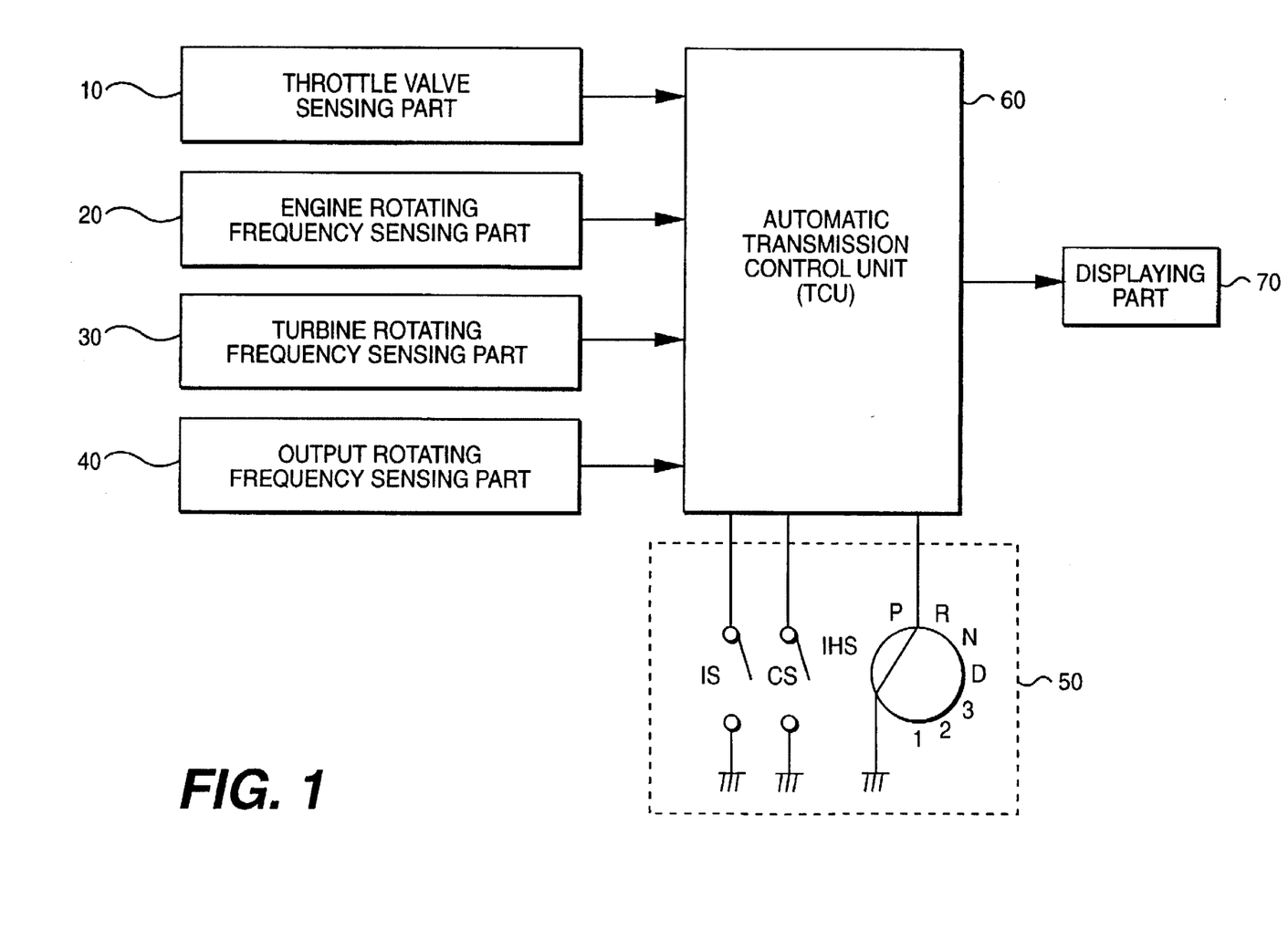
FIG. 1 is a block diagram of a system for eliminating an error code of an automatic transmission according to first and second preferred embodiment of this invention.

FIG. 1 shows a system for eliminating an error code of an automatic transmission vehicle in accordance with a first preferred embodiment. As shown in FIG. 1, the system includes an ignition switch IS as part of switching unit 50 and an automatic transmission controlling unit 60 having an input terminal connected to an output terminal of the ignition switch IS.

The operation of the system in accordance with the first preferred embodiment is explained with reference to FIG. 2.

Figure 2:
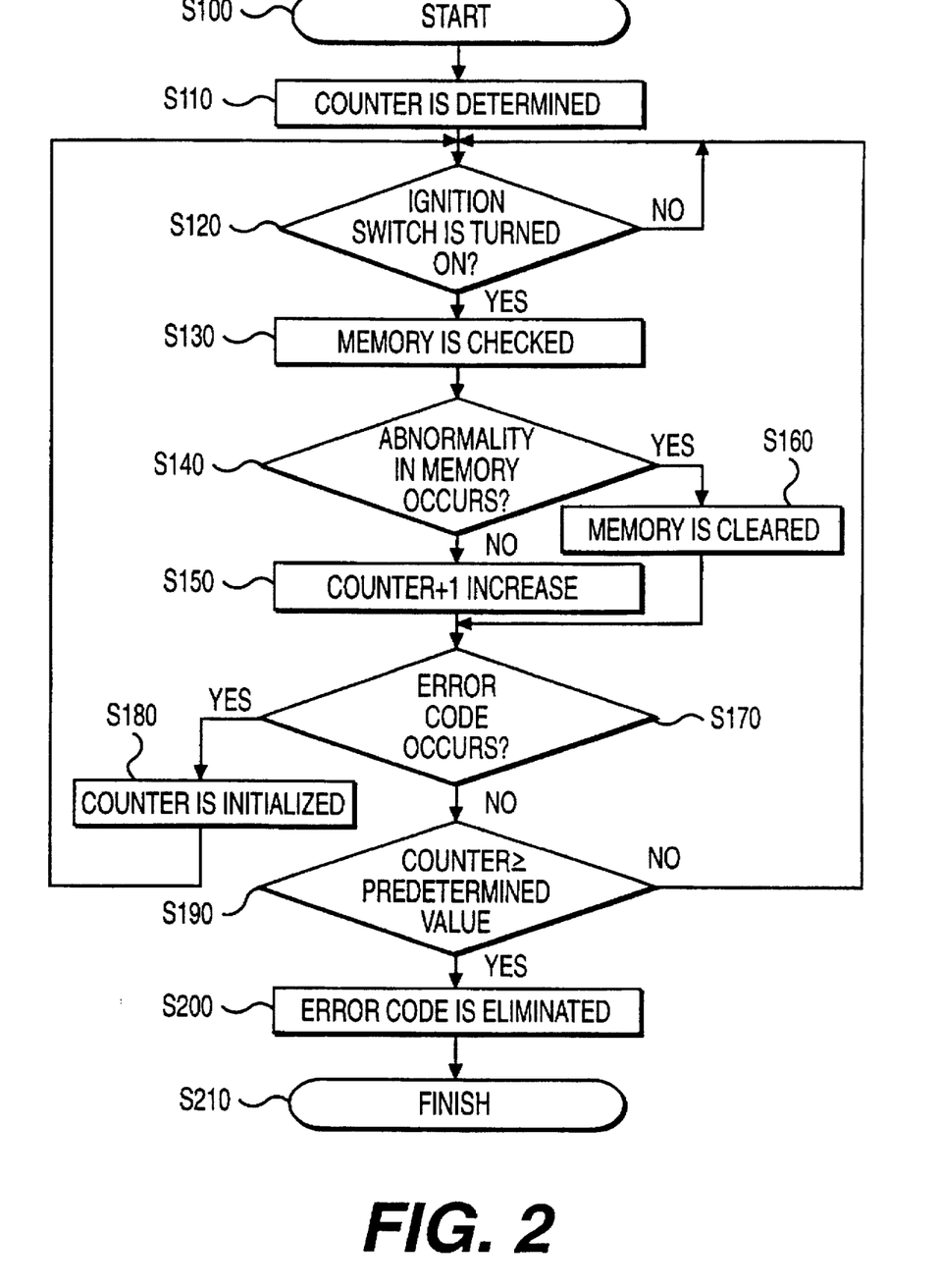
FIG. 2 is a flowchart of a method for controlling the elimination of an error code of an automatic transmission vehicle in accordance with the first preferred embodiment of this invention.

Referring to FIG. 2, once power is applied, the automatic transmission controlling unit (TCU) 60 sets (S110) a counter in an internal memory as a variable for counting the number of times the ignition switch IS is activated or turned on to eliminate an error code. Then, the automatic transmission controlling unit 60 determines (S120) whether the ignition switch IS is turned on through an electrical signal input from the ignition switch IS. If the ignition switch IS is activated, the automatic transmission controlling unit 60 checks the internal memory (not illustrated).

The TCU 60 checks the memory and determines whether any change has occurred in the memory (S140). If the memory is storing data regarding an operating condition completed in a previous drive, the automatic transmission controlling unit 60 determines that there is no abnormality and that a change has not occurred in the memory. Thus, the TCU 60 increases a counter by 1 (S150). However, if the data regarding the operating condition completed in the previous drive has changed, the TCU 60 determines that an abnormal operating condition has occurred and clears the memory (S160).

If the memory has not changed, the TCU 60 increases the counter by 1 (S150) and determines whether error codes have occurred (170). If no error code occurs, the TCU 60 compares the counter value with a predetermined value corresponding to the number of times the ignition switch IS is activated when eliminating the error code (S190). If an error code occurs, however, the TCU 60 initializes the counter value (S180) which counts the number of times the ignition switch IS is activated and repeats the process of determining whether the ignition switch IS is activated.

If the ignition switch IS has not been activated more than a predetermined number of times, the counter value is less than the predetermined value (S190) and the TCU 60 repeats the operation of determining whether the ignition switch IS is activated (S120). However, if the ignition switch IS has been activated more than the predetermined number of times, the counter value is larger than the predetermined value (S190) and the TCU 60 eliminates the error code stored in the internal memory (S200) and thus completing the operation (S210).

The system and method for eliminating an error code in the automatic transmission vehicle are now described according to a second preferred embodiment.

As shown in FIG. 1, the system according to the second preferred embodiment includes a throttle valve sensing unit 10 for sensing a level of the throttle valve opening, an engine rotating frequency sensing unit 20 for sensing the rotating frequency of the engine (RPM), a turbine rotating frequency sensing unit 30, an output rotating frequency sensing unit 40, which are all connected to the automatic transmission controlling unit 60. A switching unit 50 is connected to the automatic transmission controlling unit 60 and includes an ignition switch IS, a mode selection switch CS, and an inhibiter switch IHS. A display unit 70 is connected to an output terminal of the automatic transmission controlling unit 60.

In certain instance, the error codes may be eliminated using simple operations. However, using simple operation to eliminate the error codes may produce malfunctions. Thus, the present invention anticipates malfunctions and corrects them using the steps described below.

Figure 4A:
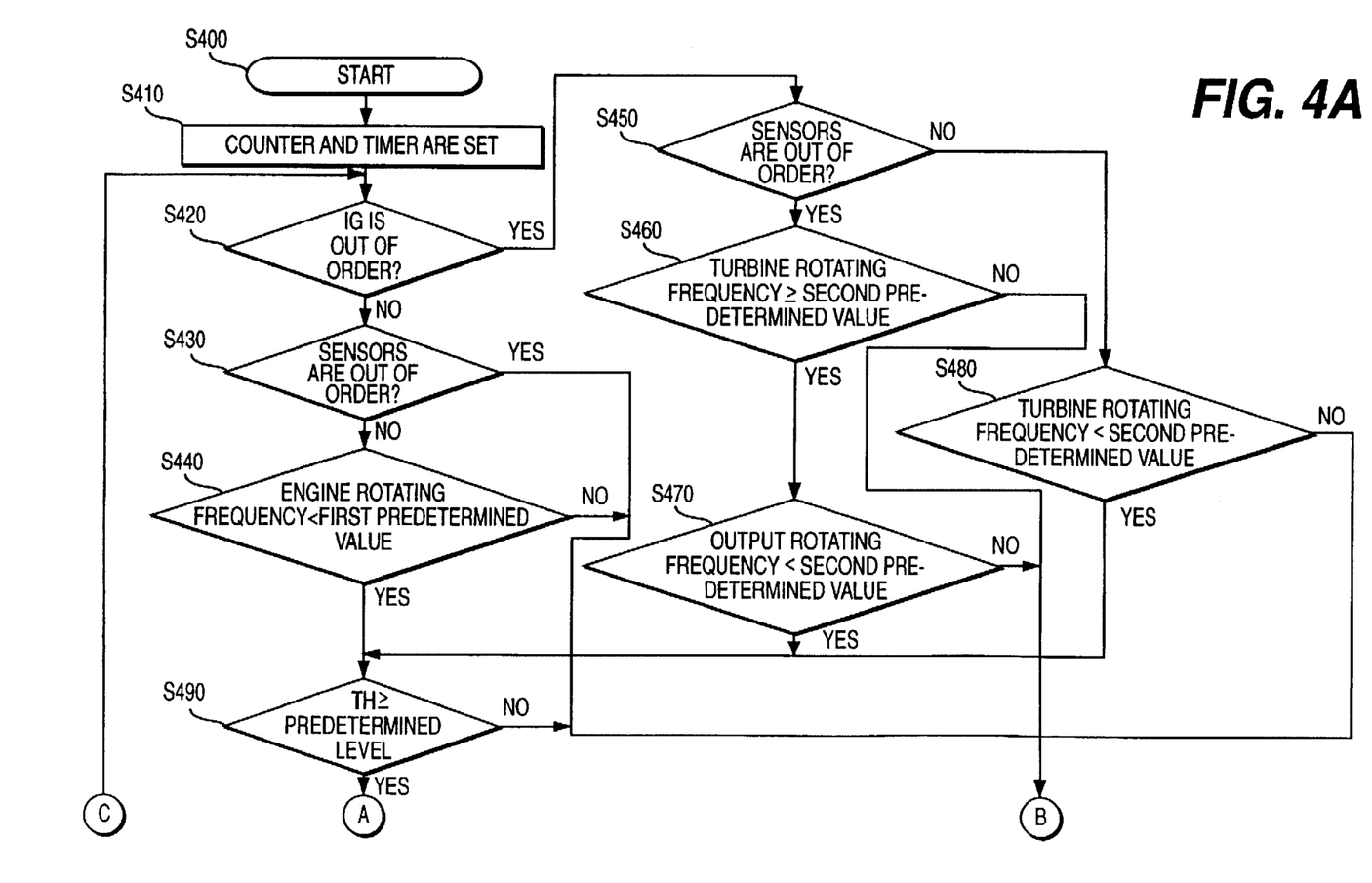
FIGS. 4A-4C constitute a flowchart of a method for controlling the elimination of an error code in an automatic transmission vehicle in accordance with the second preferred embodiment of the present invention.
Figure 4B:
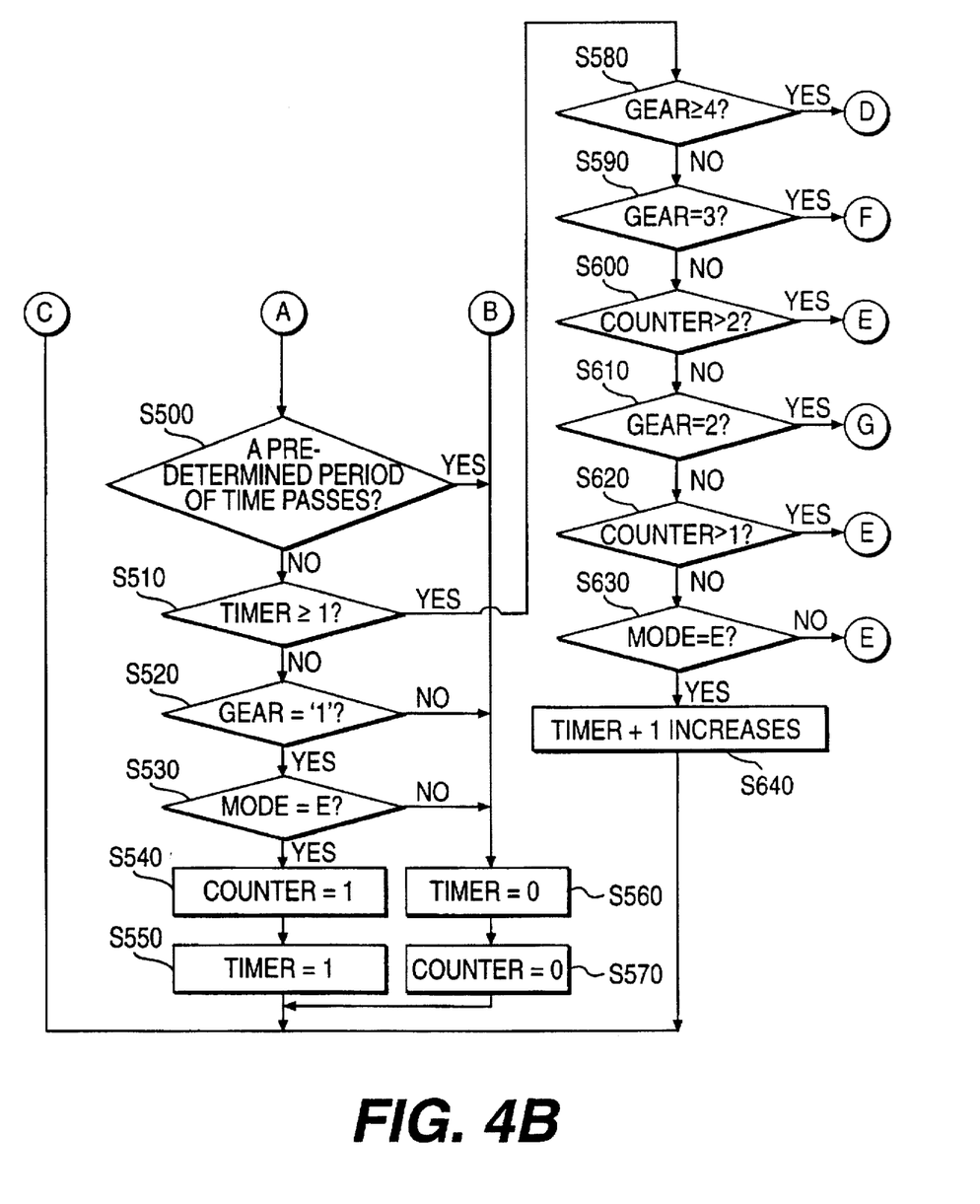
Figure 4C:
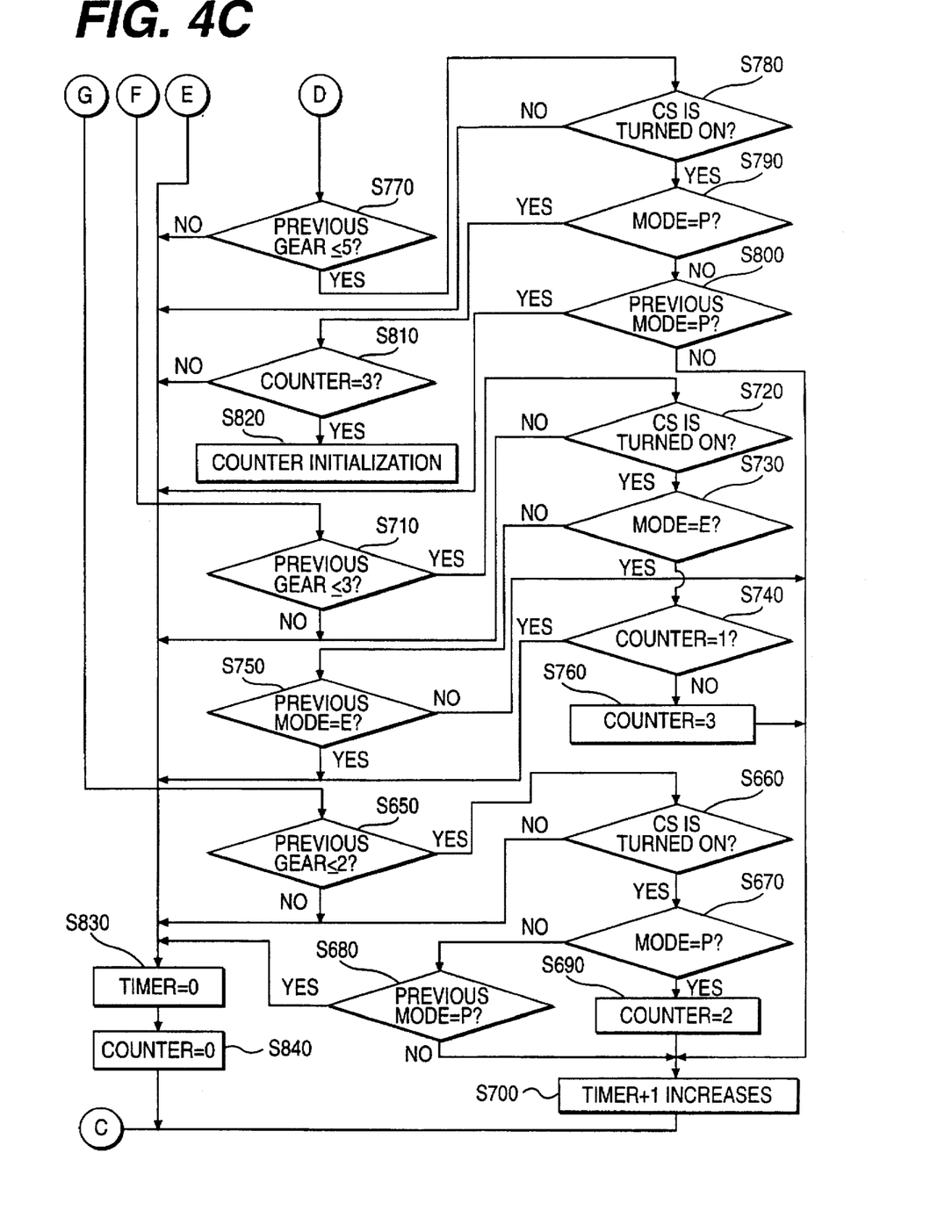

The operation of the system according to the second preferred embodiment is explained below referring to FIGS. 4A–4C.

A basic outline of the method for eliminating an error code according to the second preferred embodiment includes a first step including substep A, a second step including substeps B and C, a third step including substeps D and E, and a fourth step including substeps F and G. The four steps including substeps A–G will be discussed in detail below. Performing these steps in sequence eliminates or cancels the error code.

Once power is applied, the automatic transmission controlling unit (TCU) 60 sets a timer for counting time and another counter for counting steps in an internal memory for eliminating an error code (S410). Then, the TCU 60 determines whether the conditions or the vehicle satisfy predetermined conditions for eliminating an error code and begins measuring time through the timer (S420 to S490). In particular, the TCU 60 determines whether an ignition fault has occurred, which shows an abnormality in a part that senses the engine rotating frequency (S420). If there if no ignition fault, the TCU 60 determines whether any one of the sensors outputting electric signals in response to the condition of the vehicle is out of order (S430).

If there are no ignition fault and no abnormality in the sensors, the TCU 60 compares (S440) the engine rotating frequency input from the engine rotating frequency sensing unit 20 to a first predetermined value (S440). If the engine rotating frequency of the vehicle is less than the first predetermined value, which is a threshold value for stopping the engine, the TCU 60 determines whether the level TH of a throttle valve opening is at a maximum region (S490).

However, if the ignition fault has occurred, the TCU 60 determines whether the sensors are out of order (S450). If any one of the sensors is out of order, the TCU 60 compares the turbine rotating frequency, which is input to the transmission from the engine through a torque converter, to a second predetermined value. Depending on this comparison (if the turbine rotating frequency is greater than or equal to the second predetermined value), the TCU 0 compares the output rotating frequency to the second predetermined value (S460 to S470).

The turbine rotating frequency sensing unit 30 senses the rotating frequency of the torque converter turbine. The output rotating frequency sensing unit 40 senses the output rotating frequency produced from the transmission and converts the output rotating frequency to an electrical signal, which is sent to the TCU 60.

If the turbine rotating frequency is greater than or equal to the second predetermined frequency and the output rotating frequency is less than the second predetermined value, the TCU 60 determines that the engine is stopping. The TCU 60 also determines whether the level TH of the throttle valve opening is equivalent to a maximum region (S490).

Also, the TCU 60 compares the turbine rotating frequency to the second predetermined value provided that the ignition fault has occurred and the sensors are functioning normally, i.e., not out of order (S480). If the turbine rotating frequency is less than the second predetermined value to stop the engine, then the TCU 60 determines whether the level TH of the throttle valve opening is at a maximum region (S490).

At step S490, the TCU 60 determines whether the level TH of the throttle valve opening is greater than a predetermined level. The level TH is equivalent to the maximum region when conditions meet for stopping the engine. When the level TH of the throttle valve opening is equivalent to maximum region, the TCU 60 determines that the driver has taken action to eliminate the error code and initiates the operation for eliminating or cancelling the stored error code.

When the automatic transmission is in an abnormal operating condition, the TCU 60 indicates an error code through the displaying means 70 to warn the driver or an auto mechanic, for example, and the error code is stored in the internal memory of the automatic transmission controlling unit 60. In order to eliminate the error code stored in the memory, the driver or auto mechanic operates the shift lever and selects a mode, as shown in FIGS. 3A–3G.

If the conditions for eliminating the error code stored in the internal memory of the TCU 60 are satisfied, i.e., conditions for an engine stop has been met, the TCU 60 determines whether the time has exceeded a predetermined time value (S500). If the time has not exceeded the predetermined time value for eliminating the error code, the TCU 60 determines whether the time count in the timer is greater than or equal to 1 (S510). If the time count in the timer is less than 1, the TCU checks the present position of the shift lever and the mode selection condition. In general, the shift lever of an automatic transmission vehicle shifting in five speed ratios includes P, R, N, D, 3, 2 and L.

The driving mode includes an economy mode and a power mode. The economy mode increase reliability and durability sufficient to load the engine with high output power and ensures low fuel consumption as well as low noise. The power mode allows higher speeds. Accordingly, a driver can operate a vehicle at a desired mode, power or economy, through the mode selection switch CS (see FIG. 1). The mode selection switch CS may be configured as a toggle switch such that either the power mode or the economy mode is selected at any one time.

When a driver manipulates the shift lever, a corresponding shift lever position of the inhibiter switch IHS, which is linked to the shift lever, is set to produce an electrical signal. The electrical signal, which corresponds to the shift lever position, is sent to the TCU 60.

Figure 3A:
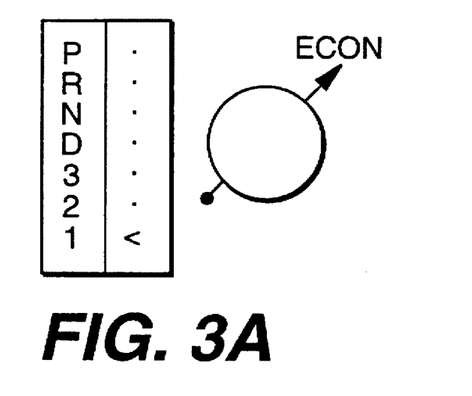
FIGS. 3A-3G illustrate the predetermined condition of a shift lever and a mode selection lever of the system for eliminating an error code of the automatic transmission.

If the present shift lever is determined to be at a "1" (or L) position (S520), the TCU determines whether the present driving mode is an economy mode ECON (S530), as shown in FIG. 3A. If the driving mode is in the economy mode ECON, the TCU 60 determines that the first step for eliminating the error code is complete. The TCU sets the counter to 1 (S540) and the timer to 1 (550) and determines whether the conditions for eliminating the error code are satisfied (S420 to S490, see FIG. 4A).

If the conditions for eliminating the error code are not satisfied in steps S 420 to S490, the automatic transmission controlling unit 60 initializes the timer and the counter (S560 to S570), and then repeats the steps beginning from step S420. However, if the conditions for eliminating the error code are satisfied, the TCU 60 determines whether the present shift lever is higher than or the same as the "D" or "4" position, provided that the time count in the timer is greater than 1 in step S510 (S580).

If the shift lever is lower than the "D" position and the present shift lever is not set at the "3" position (S590), the TCU determines whether the counter value is greater than 2 (S600). Since the counter value is i (from step S540), the TCU 60 determines whether present shift lever is set at the "2" position (S610).

As shown in FIG. 3A, when the shift lever is set at the "L" or "1" position and the mode is the economy mode ECON, the counter and the timer are set to 1 (S540 and S550). When the shift lever is determined to be set at the "2" position (see FIG. 3B), the TCU 60 determines that the previous shift lever was lower than or the same as the "2" position (S650).

Figure 3B:
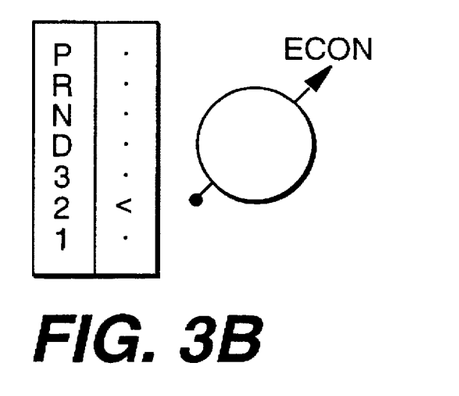

If the present condition is as shown in FIG. 3B, the shift lever of A is the "L" position and lower than the "2" position, and the TCU 60 determines whether the mode selection switch CS is being operated (S660). If the mode selection switch CS is being operated, the TCU 60 determines whether the present drive mode is a power mode POWER (S670). If the present mode is an economy mode ECON, however, as shown in FIG. 3B, the TCU 60 determines whether the previous mode was a power mode (S680).

If the previous mode was not a power mode POWER, the time count of the timer is increased by 1 (S700) and the TCU 60 returns to step S420 to determine whether the conditions for eliminating error code are met. Then, the above operation is repeated.

Figure 3C:
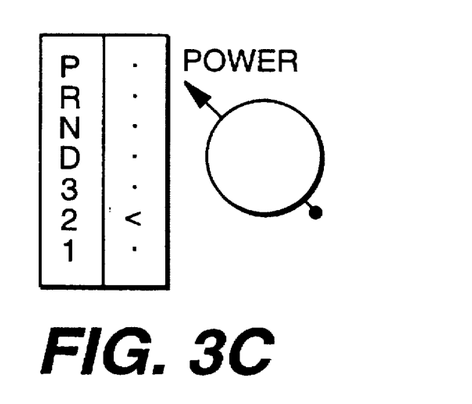

If the present mode in step S670 is set at the second ("2") position in the power mode, as shown in FIG. 3C, the TCU 60 determines that the second step for eliminating the error code is complete and sets the counter to 2 (S690). Then, the TCU 60 increases the timer by 1 (S700) and returns to step S420 to increase the timer by 1 (S700) and returns to step S 420 to determine whether the conditions are satisfied.

Figure 3D:
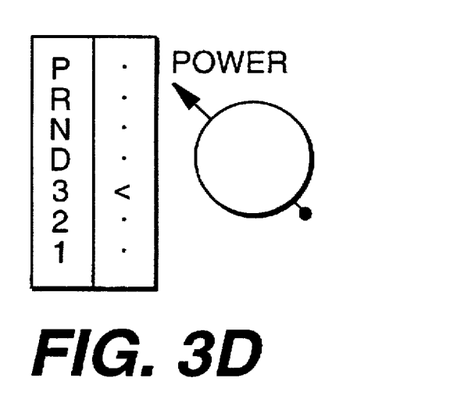

After the second step for eliminating the error code is complete, on the step S590, the TCU 60 determines whether the previous shift lever is lower than or the same as the "3" position, as shown in FIG. 3D (S710). If the previous condition is set at the "2" position, which is lower than the "3" position as shown in FIG. 3C, the TCU 0 determines whether the mode selection switch CS is activated or turned on (S720). If the mode selection switch CS is turned on, the TCU 60 determines whether the present mode is the economy mode E (S730).

However, if the present mode is not the economy mode E, as shown in FIG. 3D, the TCU 60 determines whether the previous mode was an economy mode E (S750). If the previous mode was not an economy mode E as shown in FIG. 3C, the TCU 60 again increase the time count of the timer by 1 (S700) and returns to step S420 to determine whether the conditions for eliminating the error code are satisfied and repeats the operation.

Figure 3E:
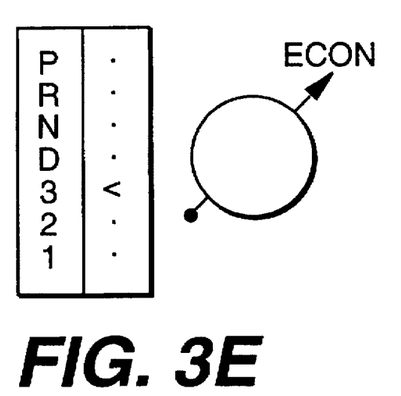

If the present mode is the economy mode E in step S730 as shown in FIG. 3E, the TCU 60 determines whether the counter is equal to 1 (S740). If the counter value has been set to 2 in step S690, the TCU 60 determines that the third step for eliminating the error code is complete and sets the counter value to be 3 (S760). Then, the TCU 60 increases the time count in the timer by 1 (S700) and returns to step S420 to determines whether the condition for eliminating the error code are satisfied and repeats the above operation.

If the present shift lever is higher than at the "4" position in step S580, the TCU 60 determines whether the previous position of the shift lever was lower than or the same as the "5" position (S770). If the previous position of the shift lever was set at the "3" position, i.e., the D position (lower than the "5" position), and the mode selection switch is determined to be turned on (S780), the TCU 60 determines whether the present mode is a power mode is a power mode (S790).

Figure 3F:
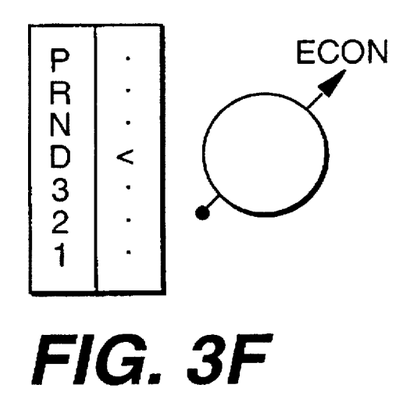
Figure 3G:
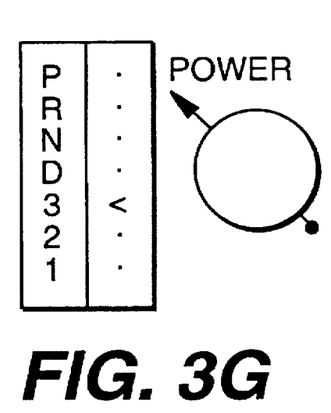

If the present mode is the economy mode, as shown in FIG. 3F, the TCU 60 determines whether the previous mode was a power mode POWER (S800). If the previous mode was not a power mode POWER, as shown in FIG. 3E, the TCU increases the timer by 1 (S700) and determines whether the conditions for eliminating the error code are satisfied (S420). If the position of the shift lever is set at the D position, as shown in FIG. 3G in the above step S790 and the present mode is a power mode POWER, the TCU 60 determines (S810) whether the counter value is 3 and determines that the third step of the method for eliminating the error code is complete (S810).

The TCU 60 determines that all the steps are complete when the present position of the shift lever is at the "4" position and the driving mode is a power mode POWER. Then, the TCU 60 initializes the timer and the counter to complete the steps (S830 to S840).

If the value of the timer is greater than a predetermined time value or the conditions for eliminating the error code are not satisfied in step S500, the TCU 60 initializes the timer and counter and then finishes the operation (S560 to S570).

If the mode selection switch CS is not operated and the previous step did not have a desired drive mode, the TCU 60 initializes the timer and the counter and determines whether the conditions for eliminating the error code are satisfied to repeat the operation.

The duration of the timer is set to about 10 seconds and the manipulation of the shift lever and mode selection in FIGS. 3A–3G should be carried out preferably within 10 seconds. Accordingly, the error code stored in the internal memory of the TCU 60 is eliminated through the above operation. As mentioned above, when the ignition switch is turned on more than a predetermined number of times in the preferred embodiments, the error code is automatically eliminated to reduce the time required to eliminate the error code. The error code is eliminated through the shift lever and the mode selection switch.

Figure 5:
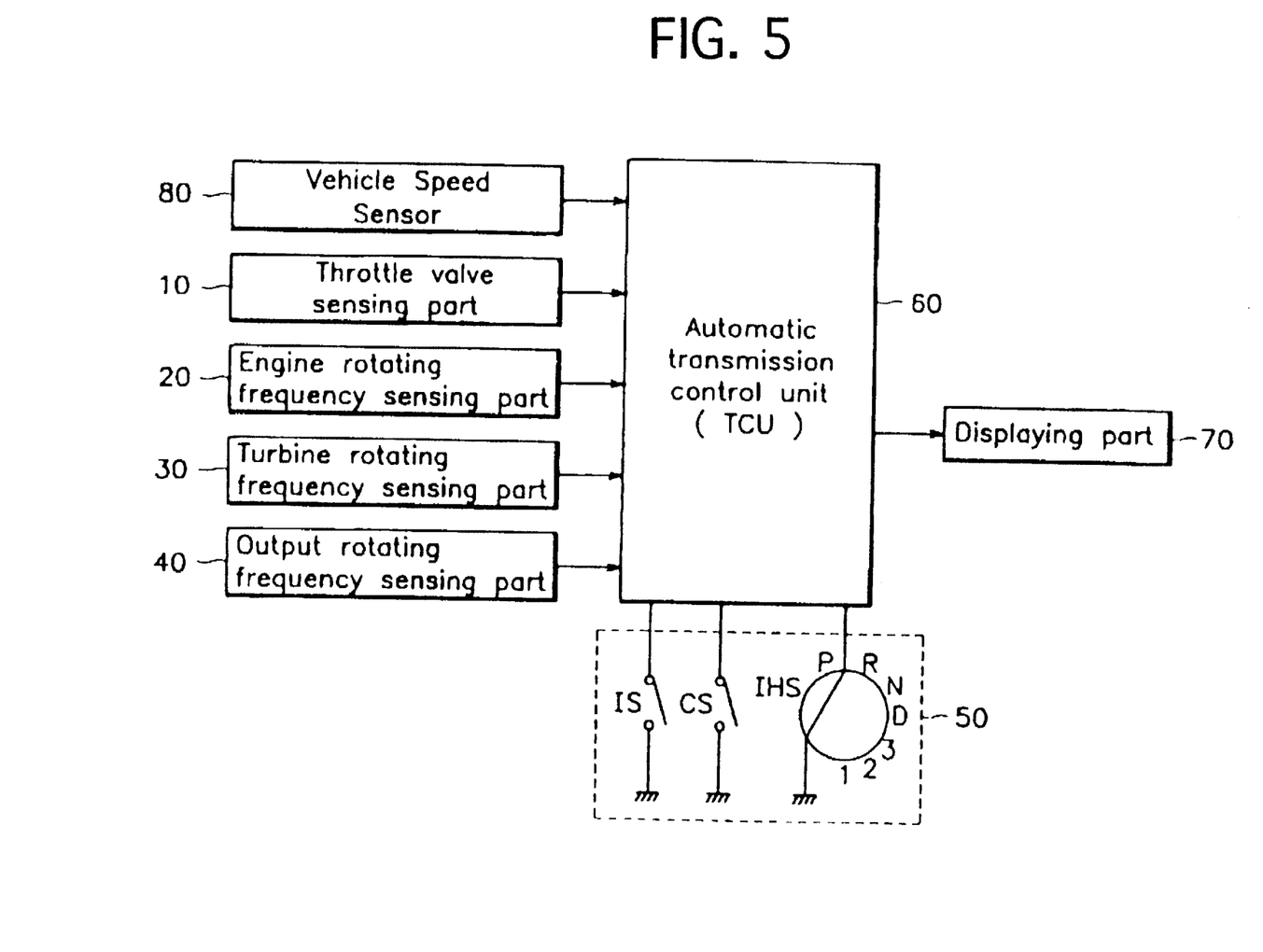
FIG. 5 is a block diagram showing a modification of the system shown in FIGS. 1 and 2 for eliminating an error code of an automatic transmission vehicle.

FIG. 5 shows a modified system for eliminating an error code of an automatic transmission vehicle in accordance with a preferred embodiment. As shown in FIG. 5, the system again includes the ignition switch IS as part of switching unit 50, the vehicle speed sensor 80 for sensing the speed of the vehicle, and the automatic transmission controlling unit 60 having an input terminal connected to an output terminal of the ignition switch IS and the vehicle speed sensor 80.

Figure 6:
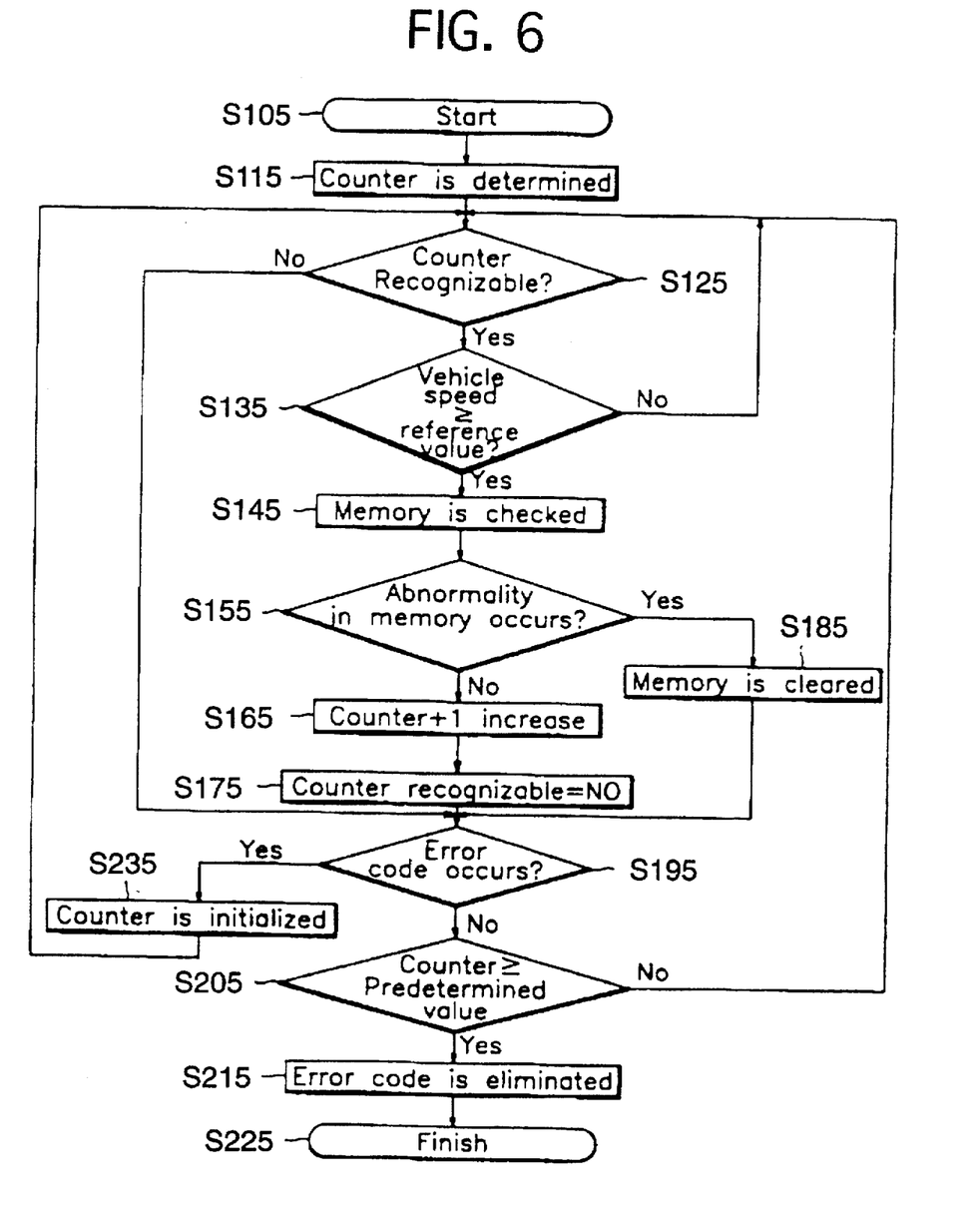
FIG. 6 is a flowchart depicting operation of the system shown in FIG. 5.

The operation of the system in accordance with the preferred embodiment of FIG. 5 is explained with reference to FIG. 6.

Once power is applied, the automatic transmission controlling unit (herein after referred to TCU) 60 sets a counter in an internal memory as a variable for counting the number of times the ignition switch IS is activated or turned on to eliminate an error code (S115).

The TCU 60 checks a counter recognizing flag stored in the internal memory (not shown) and determines whether the counter is recognizable (S125). When the counter recognizing flag is to be set as "yes", the counter is recognizable. If the counter is recognizable, the TCU 60 measures the speed of the vehicle through the vehicle speed sensor 80 and determines whether the vehicle speed is greater than a reference speed (S135). If the vehicle speed is greater than the reference speed, the TCU 60 determines that the automatic transmission is being driven, and checks the internal memory to determine whether any abnormal operation occurs. If the memory is storing data regarding an operating condition completed in a previous drive, the TCU 60 determines that there is no abnormality and that a change has not occurred in the memory. Thus, the TCU increases a counter by 1 (S165) and sets the counter recognizing flag to be "no" (S175). However, if the data regarding the operating condition completed in the previous drive has changed, the TCU 60 determines that an abnormal operating condition has occurred and clears the memory (S185).

If the abnormal operation condition does not occur, the TCU 60 increases the counter by one, sets the counter recognizing flag to be "no", and determines whether error codes have occurred (S195). If no error code occurs, the TCU compares the counter value with a predetermined value corresponding to the number of times the ignition switch IS is activated when eliminating the error code (S205). If an error code occurs, however, the TCU initializes the counter value corresponding to the number of times the ignition switch is activated (S235) and repeats the process of determining whether the ignition switch IS is activated.

If the ignition switch IS has not been activated more than a predetermined number of times, the counter value is less than the predetermined value (S205) and the TCU 60 repeats the operation of determining whether the ignition switch IS is activated (S125). However, if the ignition switch IS has been activated more than the predetermined number of times, the counter value is larger than the predetermined value (S205) and the TCU 60 eliminated the error code stored in the internal memory (S215) and thus completing the operation (S225).

It will be apparent to those skilled in the art that various modifications and variations can be made in the system and method for eliminating error code of an automatic transmission of the present invention without departing from the spirit or scope of the invention. Thus, it is intended that the present invention cover the modification and variations of this invention provided they come within the scope of the appended claims and their equivalents.

What is claimed is:

1. A system for eliminating an error code of an automatic transmission of an automotive vehicle comprising:
   means for sensing a rotating frequency of an engine and producing a first electrical signal corresponding to a first rotating frequency;
   means for sensing a rotating frequency of a turbine and producing a second electrical signal corresponding to a second rotating frequency;
   means for sensing a rotating frequency produced from an automatic transmission and producing a third electrical signal corresponding to a third rotating frequency;
   means for sensing an amount of opening of a throttle valve and producing a fourth electrical signal corresponding to the opening amount;
   a switching unit including an ignition switch, a mode selection switch, and an inhibiter switch for producing a fifth electrical signal according to a selection by a driver; and
   an automatic transmission controlling unit including:
      means for setting a timer and a counter when power is applied;
      means, responsive to the switching unit, for determining whether an ignition fault has occurred;
      means for determining whether a malfunction has occurred in any one of the plurality of the sensing means and in a part receiving the engine rotation;
      means for receiving the first signal corresponding to the first rotating frequency to determine whether the engine is stopping when the ignition fault has not occurred;
      means for receiving the second signal corresponding to the second rotating frequency and the third signal corresponding to the third rotating frequency to determine whether the engine stopping when the ignition fault has occurred and the malfunction occurs in any of the plurality of the sensing means;
      means for receiving the second signal corresponding to the second rotating frequency to determine whether the engine is stopping when the malfunction occurs in the part receiving the engine rotation;
      means for determining a position of a shift lever and a driving mode when the engine is stopping and an opening level of the throttle valve is greater than or equal to a predetermined lever; and
      means for setting a counter to one of a plurality of predetermined numbers according to the position of the shift lever and driving mode to eliminate the error code.

2. The system according to claim 1, wherein the automatic transmission controlling unit further includes:
   means for setting the counter to a first set number when the shift lever is set at a first gear position and the driving mode is in an economy mode at an initial stage;
   means for setting the counter to a second set number when the shift lever is set at a second gear position and the driving mode is the power mode;
   means for setting the counter to a third set number when the shift lever is set at a third gear position and the driving mode is the economy mode; and
   means for initializing the counter when the shift lever is set at a fourth gear position and the driving mode is a power mode to eliminate the error code.

3. A method for eliminating an error code of an automatic transmission vehicle comprising the steps of:
   initializing a counter and a timer when power is applied;
   determining whether conditions for turning on an ignition switch and stopping an engine and the automotive vehicle are satisfied;
   determining whether an opening level of a throttle valve is greater than a predetermined level;
   determining whether a position of a shift lever is set at a first gear position and a driving mode is an economy mode;
   setting the timer to a first number and setting the counter to the first number when the shift lever is at the first gear position and the driving mode is the economy mode;
   increasing the timer by the first number and setting the counter to a second number when the shift lever is at a second gear position and the driving mode is a power mode;

increasing the timer by the first number and setting the counter to a third number when the shift lever is at a third gear position and the driving mode is the economy mode; and initializing the timer and the counter and eliminating the error code when the shift lever is set at a fourth gear position and the driving mode is the power mode.

4. The method according to claim 3, wherein the step for determining whether conditions for eliminating the error code are present comprises the steps of:

determining whether a turbine rotating frequency is less than a predetermined value and whether the engine is stopping when the ignition fault occurs in a part receiving a rotation of the engine;

sensing the turbine rotating frequency and an output rotation signal and determining whether the engine is stopping when the ignition fault occurs and malfunctions occur in a plurality of sensors;

sensing the engine rotating frequency and determining whether the engine is stopping when the ignition fault does not occur; and adjusting an opening level of a throttle valve to a predetermined level for eliminating the error code when the engine is stopping.

5. A system for eliminating an error code of an automatic transmission of an automotive vehicle comprising:

an ignition switch for producing an electrical signal in response to an activation of the switch by a driver;

means for sensing speed of the vehicle and producing a signal corresponding to the speed of the vehicle; and a controller including:
 a memory for storing data corresponding to an abnormal operating condition;
 a counter;
 means for setting the counter to count the number of times the ignition switch is turned on;
 means for determining whether the abnormal condition has occurred when the counter is recognizable and the speed of the vehicle is greater than a reference speed;
 means for increasing the counter by a predetermined number when the abnormal operating condition has not occurred;
 means for determining whether an error code corresponding to the abnormal condition is generated;
 means for comparing a value of the counter to a predetermined value when the error code is generated, the value of the counter being equal to the number of times the ignition switch is turned on; and
 means, responsive to the comparing means, for eliminating the error code when the value of the counter is larger than the predetermined value.

6. A method for eliminating an error code of an automatic transmission of an automotive vehicle comprising:

producing an electrical signal in response to turning on an ignition switch by a driver;

sensing speed of the vehicle and producing a signal corresponding to the speed of the vehicle;

storing data corresponding to an abnormal operating condition;

setting a counter to count the number of times the ignition switch is turned on;

determining whether the abnormal condition has occurred when the counter is recognizable and the speed of the vehicle is greater than a reference speed;

increasing the counter by a predetermined number when the abnormal operating condition has not occurred;

determining whether an error code corresponding to the abnormal condition is generated;

comparing a value of the counter to a predetermined value when the error code is generated, the value of the counter being equal to the number of times the ignition switch is turned on; and eliminating the error code when the value of the counter is larger than the predetermined value.

* * * * *

UNITED STATES PATENT AND TRADEMARK OFFICE
CERTIFICATE OF CORRECTION

PATENT NO. : 5,715,161
DATED : February 3, 1998
INVENTOR(S) : SEO

It is certified that error appears in the above-indentified patent and that said Letters Patent is hereby corrected as shown below:

On the Title Page, Item [75], in the Inventor, line 1, "Jeongdo" should read --Jeong do--.

In Claim 1, Col. 10, line 29, "lever" should read --level--.

Signed and Sealed this

Twelfth Day of May, 1998

BRUCE LEHMAN

*Attest:*

*Attesting Officer*     Commissioner of Patents and Trademarks